US008520778B2

(12) United States Patent
Sameer et al.

(10) Patent No.: US 8,520,778 B2
(45) Date of Patent: Aug. 27, 2013

(54) SYSTEM AND METHOD FOR ESTIMATION AND CORRECTION OF CARRIER FREQUENCY OFFSET IN MIMO-OFDM BASED WIRELESS COMMUNICATIONS SYSTEMS

(75) Inventors: Saheerudeen Mohammed Sameer, West Bengal (IN); Ratnam Varada Rajakumar, West Bengal (IN)

(73) Assignee: Indian Institute of Technology, West Bengal (IN)

( * ) Notice: Subject to any disclaimer, the term of this patent is extended or adjusted under 35 U.S.C. 154(b) by 332 days.

(21) Appl. No.: 12/989,517

(22) PCT Filed: Apr. 22, 2009

(86) PCT No.: PCT/IN2009/000246
§ 371 (c)(1),
(2), (4) Date: Jan. 10, 2011

(87) PCT Pub. No.: WO2009/130713
PCT Pub. Date: Oct. 29, 2009

(65) Prior Publication Data
US 2011/0110445 A1  May 12, 2011

(30) Foreign Application Priority Data

Apr. 23, 2008 (IN) .............................. 762/KOL/2008

(51) Int. Cl.
*H04L 27/00* (2006.01)
*H04L 1/02* (2006.01)
*H04B 7/08* (2006.01)

(52) U.S. Cl.
USPC ........................... 375/326; 375/347; 455/137

(58) Field of Classification Search
USPC ................. 375/259, 260, 267, 295, 299, 316, 375/326, 347, 358, 362–366; 370/203, 210, 370/503, 509–514; 329/304, 306; 455/130, 455/132, 137
See application file for complete search history.

(56) References Cited

U.S. PATENT DOCUMENTS
7,009,931 B2  3/2006  Ma et al.
7,088,782 B2  8/2006  Mody et al.
(Continued)

OTHER PUBLICATIONS
Jie Zhu, Wookwon Lee "Carrier Frequency Offset Estimation for OFDM Systems with Null Subcarriers", University of Arkansas, 2004 IEEE.*

(Continued)

*Primary Examiner* — Tesfaldet Bocure
(74) *Attorney, Agent, or Firm* — The Webb Law Firm

(57) ABSTRACT

This invention relates to a Multi-Input Multi-Output Orthogonal Frequency Divisional Multiplexing (MIMO-OFDM) is a transmission technology for many current and next generation wireless communication systems. Carrier Frequency Offset (CFO) Estimation and Correction is one of the most important requirement of the proper reception of MIMO-OFDM Signals. The invention provides a null subcarrier based scheme to accomplish this task. The CFO is estimated by employing the covariance matrix of the signals on all receiving antennas with a cost function which minimizes the energy falling on the null subcarrier locations due to frequency offset. The proposed approach results in very low computational complexity as it uses a two step procedure, making it very attractive for real time applications. Also a new null subcarrier allocation scheme based on Fibonacci series is proposed which ensures a frequency offset estimation range equal to the maximum possible range equal to the OFDM bandwidth.

9 Claims, 6 Drawing Sheets

(56) References Cited

U.S. PATENT DOCUMENTS

| | | | |
|---|---|---|---|
| 7,463,577 B2* | 12/2008 | Sudo et al. | 370/208 |
| 8,040,790 B2* | 10/2011 | Ratnam et al. | 370/208 |
| 8,064,528 B2* | 11/2011 | Giannakis et al. | 375/260 |
| 2005/0041693 A1 | 2/2005 | Priotti | |
| 2006/0193392 A1 | 8/2006 | Kim et al. | |
| 2008/0043861 A1* | 2/2008 | Moffatt | 375/260 |

OTHER PUBLICATIONS

Schmidl et al., "Robust Frequency and Timing Synchronization for OFDM", IEEE Transactions on Communications, Dec. 1997, pp. 1613-1621, vol. 45, No. 12.

Morelli et al., "An Improved Frequency Offset Estimator for OFDM Applications", IEEE Communications Letters, Mar. 1999, pp. 75-77, vol. 3, No. 3.

Liu et al., "A High-Efficiency Carrier Estimator for OFDM Communications", IEEE Communications Letters, Apr. 1998, pp. 104-106, vol. 2, No. 4.

Ma et al, "Non-Data-Aided Carrier Offset Estimators for OFDM With Null Subcarriers: Identifiability, Algorithms, and Performance", IEEE Journal on Selected Areas in Communications, Dec. 2001, pp. 2504-2515, vol. 19, No. 12.

Huang et al., "Carrier Frequency Offset Estimation for OFDM Systems Using Null Subcarriers", IEEE Transactions on Communications, May 2006, pp. 813-823, vol. 54, No. 5.

Mody et al., "Synchronization for MIMO OFDM Systems", School of Electrical and Computer Engineering Georgia Institute of Technology, Oct. 26, 2008, pp. 509-513, Atlanta, GA.

Van Zelst et al, "Implementation of a MIMO OFDM-Based Wireless LAN System", IEEE Transactions on Signal Processing, Feb. 2004, pp. 483-494, vol. 52, No. 2.

Stuber et al., "Broadband MIMO-OFDM Wireless Communications", Proceedings of the IEEE, Feb. 2004, pp. 271-294, vol. 92, No. 2.

Ma et al., "Hopping Pilots for Estimation of Frequency-Offset and Multiantenna Channels in MIMO-OFDM", IEEE Transactions on Communications, Jan. 2005, pp. 162-172, vol. 53, No. 1.

Yao et al., "Blind Carrier Frequency Offset Estimation in SISO, MIMO, and Multiuser OFDM Systems", IEEE Transactions on Communications, Jan. 2005, pp. 173-183, vol. 53, No. 1.

Sun et al., "EM-Based Iterative Receiver Design With Carrier-Frequency Offset Estimation for MIMO OFDM Systems", IEEE Transactions on Communications, Apr. 2005, pp. 581-586, vol. 53, No. 4.

Jiang et al., "MIMO OFDM Frequency Offset Estimator with Low Computational Complexity", IEEE Communications Society, 2007, 6 pages.

Olsson et al., "Estimating the OFDM Carrier Frequency Offset by Locating Null Subcarriers", In: Proceedings of the Swedish System-on-Chip Conference, Apr. 18, 2005, 4 pages, Tammsvik, Sweden.

Olsson et al., "OFDM Carrier Frequency Offset Estimation Using Null Subcarriers", In: 10th International OFDM Workshop, Aug. 30, 2005, 4 pages, Hamburg, Germany.

* cited by examiner

SYSTEM AND METHOD FOR ESTIMATION AND CORRECTION OF CARRIER FREQUENCY OFFSET IN MIMO-OFDM BASED WIRELESS COMMUNICATIONS SYSTEMS

FIELD OF INVENTION

The present invention generally relates to carrier frequency offset estimation and correction in Multi-Input Multi-Output Orthogonal Frequency Division Multiplexing (MIMO-OFDM) based wireless communication systems in particular but can be applied to the conventional OFDM and other multicarrier communication systems as well. More particularly, the invention relates to a method and apparatus for determining carrier frequency offset including correction of the frequency offset in MIMO-OFDM based wireless communication systems.

BACKGROUND OF INVENTION

Orthogonal Frequency Division Multiplexing (OFDM), one of the underlying technology in MIMO-OFDM is a multicarrier communication system which converts a high data rate stream into a set of parallel low data rate streams thereby modifying the prior art problem in a wireless channel, namely frequency selective fading to a tractable flat fading. Digital communications using multiple input multiple output (MIMO) wireless links has recently emerged as one of the most promising research areas in wireless communications. The core idea of the MIMO systems is space-time signal processing in which time is complemented with the spatial dimension inherent in the use of multiple spatially distributed antennas, resulting in diversity gain or multiplexing gain or both. An exciting combination explored, to further enhance the bandwidth efficiency and throughput performance, is MIMO-OFDM. Here OFDM is used to convert the frequency selective channel in the conventional MIMO systems into a set of parallel frequency flat channels. Space-time coding is then applied to a group of tones in an OFDM symbol or on a per tone basis across OFDM symbols.

While MIMO-OFDM is robust to frequency selective fading, it is very sensitive to frequency offset caused by Doppler shifts and/or oscillator instabilities like the conventional OFDM systems. The presence of carrier frequency offset (CFO) will introduce severe inter-carrier interference (ICI), which, if not properly compensated, would results in loss of orthogonality and significantly degrade the system performance. The current demand for low-cost receivers make the design of frequency synchronization block more challenging as the amount of frequency offsets need to be 10 estimated and corrected would be in the range of a few multiples of the subcarrier spacing. On the other hand, the receiver complexity and the training overhead have to be kept at a minimum level.

Many techniques are found in state of the art which deal with carrier frequency offset estimation in conventional single input single output (SISO) OFDM systems [1-5]. For example, Schmidl-Cox algorithm [1] employs two training OFDM symbols to achieve an overall frequency estimation range of two subcarrier spacings. A modified forms of Schmidl-Cox algorithm is proposed in [2] where one training symbol with P identical subparts in time domain are used to yield an estimation range of +/−P/2 subcarrier spacings. There is a class of carrier frequency offset estimators which use either the intrinsic virtual carriers present in some of the OFDM based wireless communication standards or deliberately introduced null subcarriers in between the data carriers. They estimate the frequency offset by employing a cost function which minimize the total null subcarrier energy with the help of a global search technique. Liu and Tureli proposed a subspace based frequency offset estimate approach using consecutively placed virtual carriers at the band edges of the OFDM symbol [3]. Ma et al. suggested the use of distributed null subcarriers [4], to minimize the estimation errors associated with the use of consecutively placed virtual subcarriers proposed in [3]. Recently a null subcarrier based method is proposed which uses one complete OFDM symbol with all odd subcarriers and most of the even subcarriers as null subcarriers which are allocated based on an extended PN sequence [5].

But only a few methods are available which exclusively address the CFO estimation in MIMO-OFDM systems. There are various shortcomings in the state of the art methods. Training preamble based frequency offset estimation methods are known [6-8], which are extensions of similar techniques reported for SISO-OFDM like [1-2]. These techniques need large bandwidth overheads in order to send specific training sequences or pilot signals. A few other methods exist which aim at reducing the training overhead but the number of computations required for estimating the CFO are very high [9-11]. Higher computations amounts to higher cost and/or higher latency and both are undesirable properties. Another performance measure of CFO estimation algorithms is the range of frequency offset that they can provide. While the maximum frequency offset estimation range is equal to the OFDM bandwidth, all of the training preamble based estimation techniques provide at the most $\frac{1}{8}^{th}$ or $\frac{1}{4}^{th}$ of it only. On the contrary, methods which offer very high estimation range are computationally inefficient. An attempt for reducing the computational complexity associated with the CFO estimation is done in [12]. A few granted patents [P.1-P.2] and patent applications [P.3-P.4] also exist in the state of the art. In view of the growing popularity, efficient techniques for the CFO estimation with excellent performances are still needed for practical MIMO_OFDM system implementations.

OBJECTS OF THE INVENTION

It is therefore an object of the invention to propose a method of determining and correcting carrier frequency offset (CFO) in Multi-input Multi-output Orthogonal Frequency Division Multiplexing (MIMO-OFDM)-based wireless communication systems, which eliminates disadvantages of prior art.

Another object of the invention is to propose a method of CFO-estimation in null subscriber based MIMO-OFDM systems, which is efficient in terms of bandwith overhead and computational complexity.

A further object of the invention is to propose a method for allocating null subcarriers in the training of OFDM symbols, which is based on a modified Fibonacci series.

A still further object of the invention is to propose a method for allocating null subcarriers in the training of OFDM symbols, which enables a full frequency offset acquisition range equal to the OFDM-bandwith.

Yet another object of the invention is to propose a method of CFO-estimation in MIMO-OFDM systems, which is capable of determining and correcting integer and fractional frequency offsets separately.

SUMMARY OF INVENTION

A preferred embodiment of the invention comprises a MIMO-OFDM transmitter with $N_t$ transmit antennas ($N_t \geq 1$)

where the number of transmit antennas are selected by the order of space-time encoding scheme used, with each transmit branch processing frequency domain block of space-time data transmitting from the space-time encoder, each of the frequency domain blocks of size N samples being transformed in to time domain signals by separate N point IDFTs. The last L samples are copied on each branch to the beginning of the time domain OFDM symbols. Such signals from all the transmit branches are further processed to meet the RF requirements and transmitted. Such K number of OFDM symbols as processed are commonly denoted as an OFDM frame with the first OFDM symbol in the frame on each transmit antenna (denoted as beacon symbols) is generated by imposing specific subcarriers as null subcarriers before the IDFT operation. The locations of the beacon symbols are specified by a modified Fibonacci sequence so as to help estimation of carrier frequency offset at the receiver. The remaining subcarriers in the beacon symbol are used for useful data transmission along with other OFDM symbols in the frame, thus resulting in an enhanced bandwidth efficiency.

A preferred embodiment of the invention comprises a receiver with $N_r$ receive antennas where each antenna receives the superposition of signals transmitted by all the transmitting antennas with multipath distortions with a possible timing, including the carrier frequency offset. The carrier frequency offset can be fractions or multiples of subcarrier spacings which are used in the OFDM symbols. Thus the normalized carrier frequency offset is the sum of integer frequency offset (IFO) and fractional frequency offset (FFO). By assuming a perfect timing correction, the cyclic prefix associated with the OFDM symbols are removed and the covariance matrix of this signal is computed on each receiving antenna. The individual covariance matrices on all receive branches are combined using a maximal ratio combining (MRC) or equal gain combining (EGC). The carrier frequency offset is assumed to be identical for the signals received on all receive branches. Such an assumption is considered to be a fare assumption as the transmit and receive branches usually use the same oscillators for all the branches. The CFO is estimated by a two stage cost function minimization in which a first stage minimization yields the integer frequency estimate by calculating the total energy spilled on the null subcarrier locations due to the frequency offset by a search procedure. Thus, the first stage yield is essentially a post DFT operation where the energy at the DFT output corresponding to the null subcarriers is computed for each integer shifts from −N/2 to +N/2 and the integer shift is evaluated which yields the minimum energy. And once this is found, a correction for the same is applied by multiplying the received signal samples with the complex conjugate of the estimated integer frequency offset. Now assuming that the integer frequency offset is perfectly compensated for, a second step is initiated to estimate the fractional frequency offset by minimizing the same cost function but now with a covariance matrix of the received signal which is obtained after integer frequency offset correction. Minimizing of the cost function over a fixed number of fractional values from −0.5 to +0.5, the fractional frequency offset can be estimated. The number of such minimization points is decided by the resolution required for the fractional estimation, the minimization procedure being the same as the one used for integer frequency offset estimation. And upon estimation, the fractional frequency offset can be compensated for, before proceeding for rest of the receiver processing.

A special technical feature of the invention is the determination and adaptation of a modified Fibonacci series—based null subcarrier allocation method which ensures a CFO estimation range equal to the OFDM bandwidth, which is the maximum CFO that any MIMO-OFDM communication system can experience.

BRIEF DESCRIPTION OF THE ACCOMPANYING DRAWINGS

Figure 7:
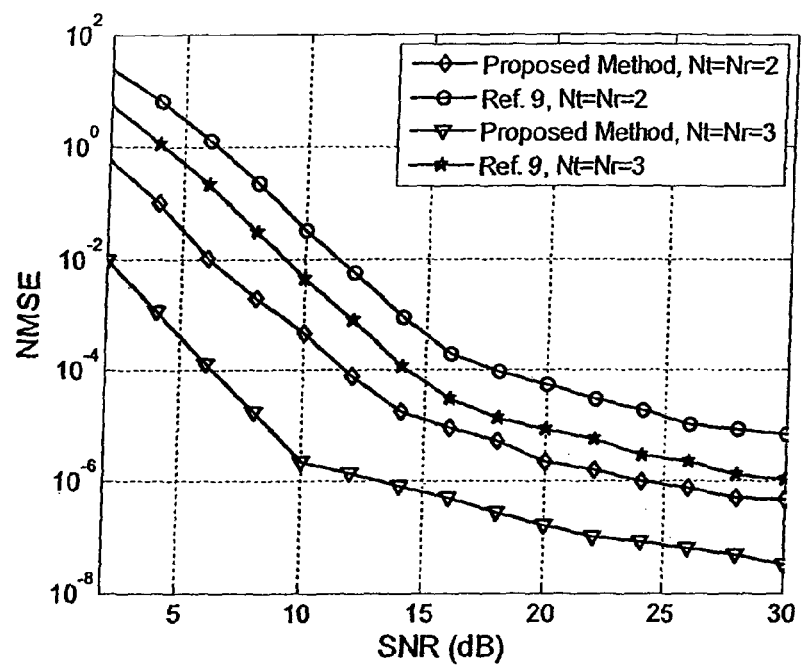

FIG. 7—a graphical representation of the normalized mean square frequency error as a function of SNR for 2 and 3 Transmit-Receive antenna pairs.

Figure 8:
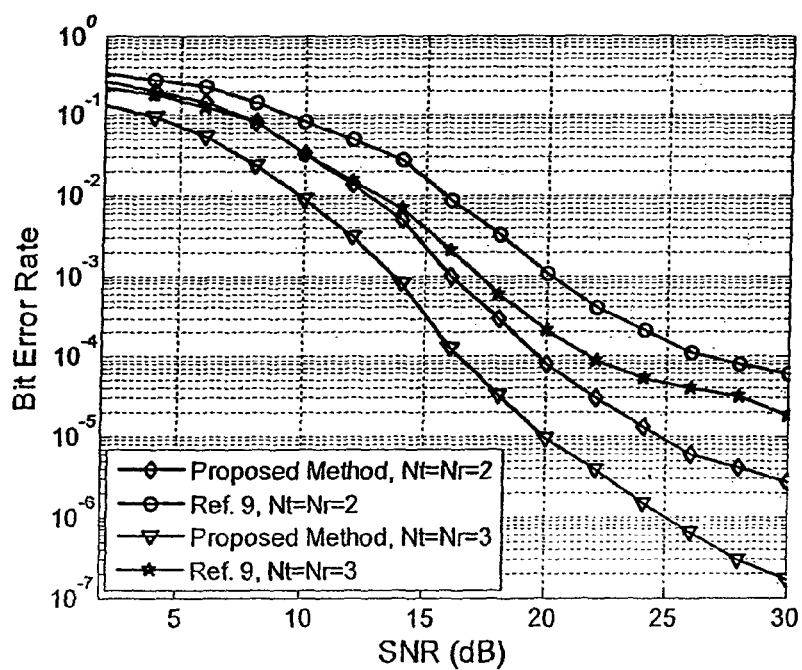

FIG. 8—a graphical representation of the bit error rate as a function of SNR for 2 and 3 Transmit-Receive antenna pairs.

DETAILED DESCRIPTION OF THE INVENTION

Figure 1:
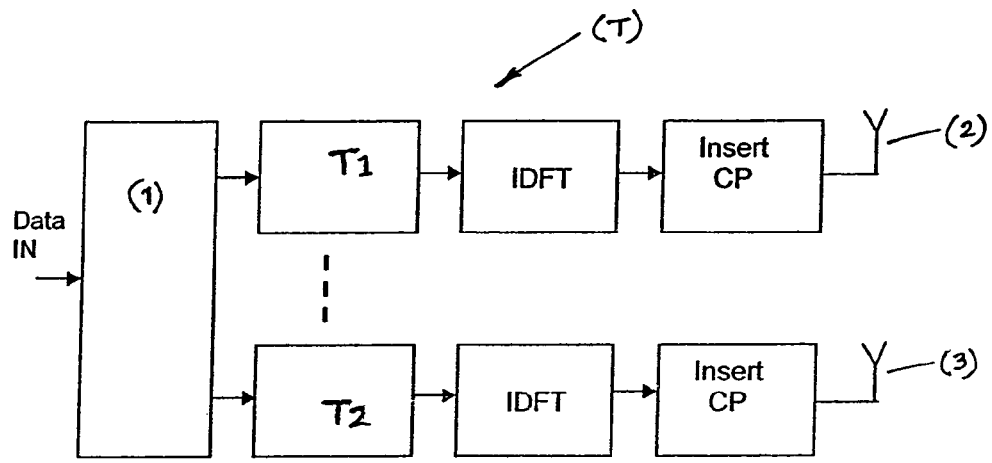
FIG. 1 is a block diagram of the baseband transmitter of the proposed Null subcarrier based MIMO-OFDM system corresponding to the training block.

FIG. 1 shows a block diagram of a generalized MIMO-OFDM transmitter (T) corresponding to the transmission of the beacon symbol, which comprises a specific sequence of null subcarriers. Each transmitter branch ($T_1$, $T_2$) receives complex block of data from a space-time encoder (1) with a block size of N samples as the underlying OFDM modulation uses N subcarriers spaced at a separation of ΔF=B/N, where B is the total system bandwidth. Out of the total N subcarriers in the beacon symbol, R subcarriers are data carriers and the remaining N-R subcarriers are null subcarriers (Z). These selected subcarriers are imposed as nulls by employing a permutation matrix. Each OFDM block is preceded by a cyclic prefix whose duration is longer than the delay spread of the propagation channel, so that inter-block interference can be eliminated at the receiver, without affecting the orthogonality of the sub-carriers. Signals in all $N_t$ transmit branches ($T_1$, $T_2$) are processed in the same way and then transmitted after the required RF Processing.

The transmitted signal from the $j^{th}$ transmit antenna (j=1, 2, . . . , Nt) is represented by $$u'_j(d) = \frac{1}{\sqrt{N}} \sum_{k=0}^{N-1} s_j(k) \exp\left(\frac{j2\pi dk}{N}\right) \quad (1)$$

with $d = -L, -(L-1), \ldots, 0, 1, 2, \ldots, N-1$ where $s_j(k)$ is the data symbol at the k-th subcarrier and L is the length of the cyclic prefix.

Figure 2:
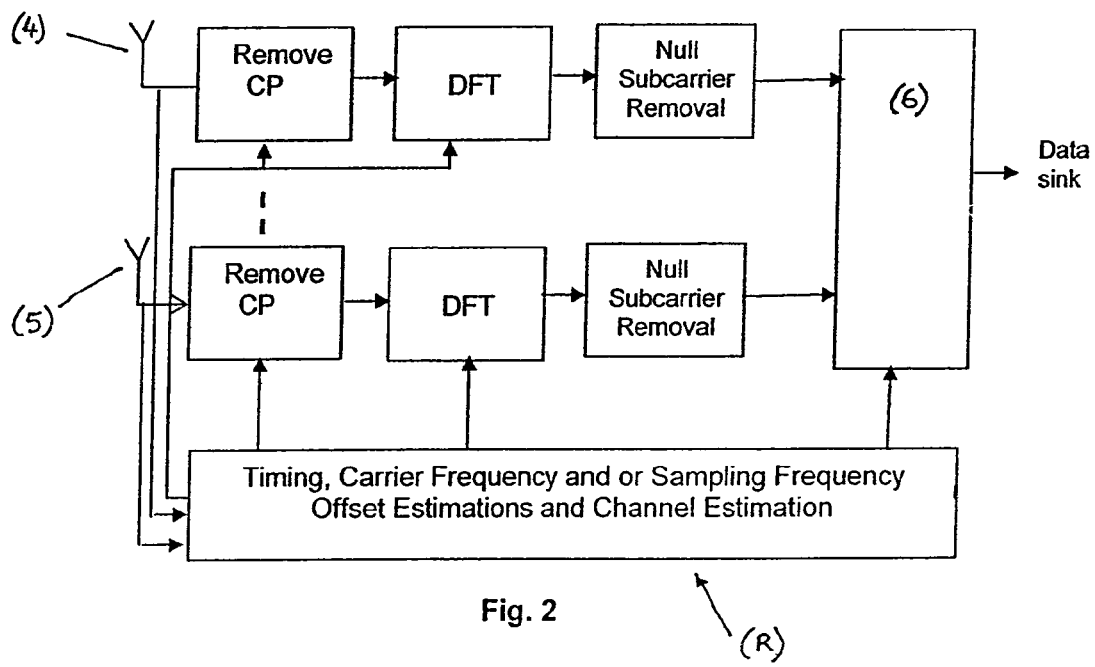
FIG. 2 is a block diagram of the generalized receiver of the null subcarrier based MIMO-OFDM system for the training block, showing the usual receiver processing.

1. A general block schematic of the OFDM receiver (R) corresponding to the beacon symbol is shown in FIG. 2. The signals received on all receive antennas (4,5) will be a superposition of all the transmitted signals, which in general are impaired by a common carrier frequency offset of the order of a few subcarrier spacing due to oscillator mismatchings and/or Doppler frequency shifts and a time shift. The received signal will also have the usual impairments due to complex additive white Gaussian noise and multipath channels. The timing offset, sampling frequency offset, carrier frequency offset and multipath channel impairments are corrected before space-time decoding by a space-time decoder (6). The present embodiment assumes that the timing and sampling frequency offset are perfectly compensated. Hence received signals for example on the $i^{th}$ antenna (i=1, 2, ..., Nr) of the receiver is given by:

$$r_i(d) = \frac{1}{\sqrt{N}} \sum_{j=1}^{N_t} \sum_{k=0}^{N-1} H_{i,j}(k) s_j(k) \exp\left(\frac{j2\pi d}{N}[k + \phi_m]\right) + z_i(d) \quad (2)$$

with $d = -L, -(L-1), \ldots, 0, 1, 2, \ldots, N-1$ where, $H_{i,j}(k)$ is the channel frequency response at the k-th subcarrier between $i^{th}$ transmit antenna and $j^{th}$ receive antenna, $\phi$ is the normalized (to the subcarrier spacing) frequency offset, which is the sum of integer frequency offset (between −N/2 to +N/2) and fractional frequency offset between −0.5 to +0.5, and $z_i(n)$ is complex additive white Gaussian noise (AWGN) for the $i^{th}$ receiver.

Figure 3:
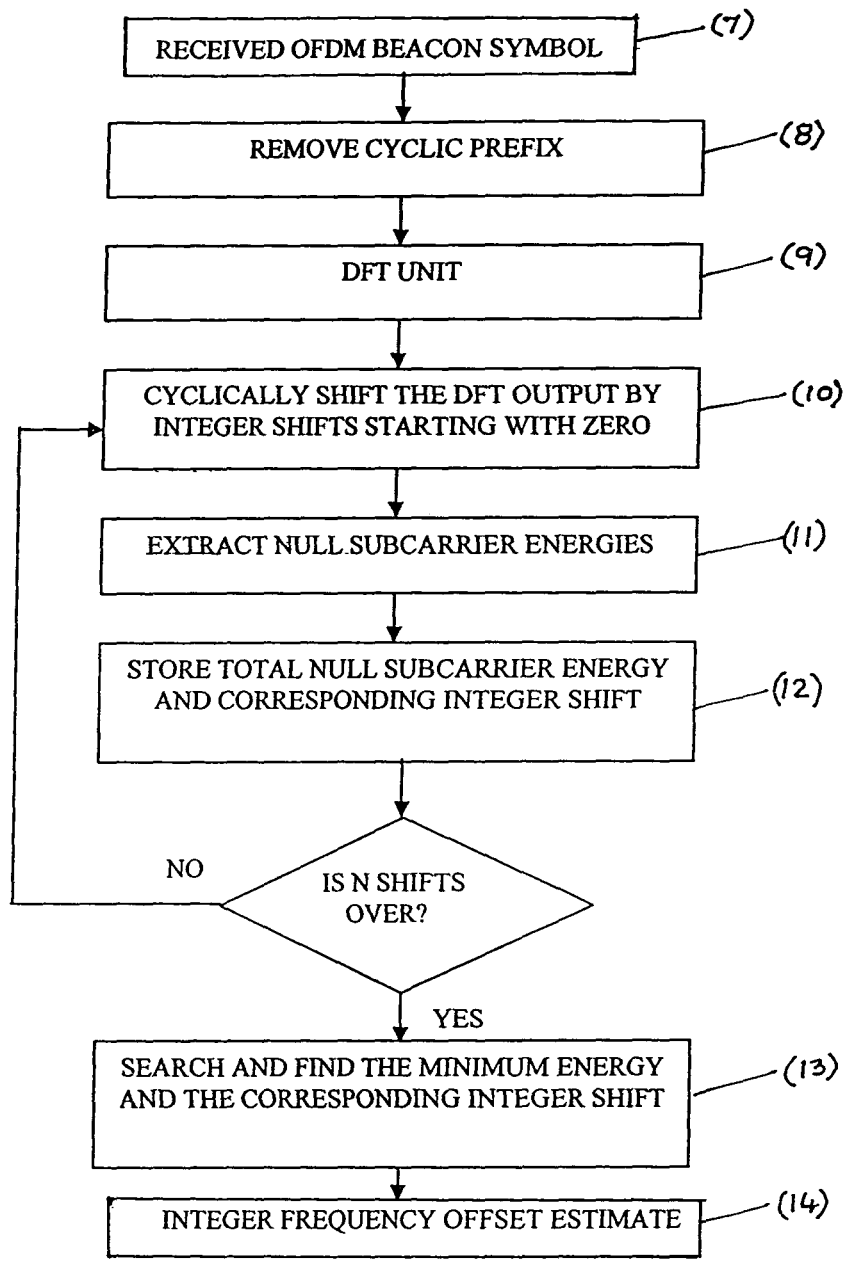
FIG. 3 is a flowchart of the method of estimating the integer frequency offset from the received beacon symbol after combining all the received signals on all receiving antennas.

FIG. 3 is a flow chart of the method of estimating the integer frequency offset wherein the OFDM beacon signals received (7) on all receiving antennas (4,5) are combined using any of the diversity combining techniques and applied to an integer frequency offset estimation unit. The cyclic prefix associated with the received OFDM signal is removed (8) and applied (9) to a DFT unit which converts the signal to the frequency domain by an N-point DFT operation and the energy of the all the subcarriers at the DFT output are computed. Next the total energy of subcarriers corresponding to the designated null subcarrier indices are computed (10) by introducing (11) cyclic shifts from 0 to N−1, and stored (12) against the corresponding integer shift introduced. Thus an N element array containing the energies is obtained and a search is carried-out (13) to find the minimum energy and the corresponding integer shift, which is designated as the integer frequency offset estimate (14). Alternatively this process can be expressed by means of a cost function as the combined received signal after removing the CP can be written in vector notation as $$y_i = \beta P(\phi) \sum_{j=1}^{N_t} FD(H_{i,j}) s_j + z_i \quad (3)$$

where $$P(\phi) = \text{Diag}\left(1, e^{j\frac{2\pi}{N}\phi}, \ldots, e^{j\frac{2\pi(N-1)}{N}\phi}\right),$$

is a diagonal matrix containing the carrier frequency offsets experienced by each samples, $\beta = \sqrt{N/(N-R)}$ is a scaling factor, F is the IFFT matrix, $D(H_{i,j}) = \text{Diag}(H_{i,j}(0), H_{i,j}(1), \ldots, H_{i,j}(N-1))$ containing the frequency domain channel coefficients with $H_{i,j}(k)$ denoting the frequency response of the channel at frequency $2\pi k/N$ between j-th transmit antenna and i-th receive antenna and $s_j$ is the data vector.

Using the log-likelihood function for the original data vector and integer frequency offset $\phi_i$, a cost function that is to be minimized can be expressed as $$Ji(\phi') = \sum_{i=1}^{Nr} \sum_{r \in \Gamma_z} v_r^H P^H(\phi') y_i y_i^H P(\phi') v_r \quad (4)$$

where $\Gamma_z$ denote the set of null subcarrier indices, $v_r$ is the r-th column of the FFT matrix and $P(\phi')$ is similar to $P(\phi)$ but initialized every time with a trial integer frequency offset $\phi'_i$.

The integer frequency offset is estimated by a search technique by initializing $P(\phi')$ each time with the trail integer offset value. If $P(\phi')$ is the actual integer frequency offset estimate, the cost function will reach a minimum.

Figure 4:
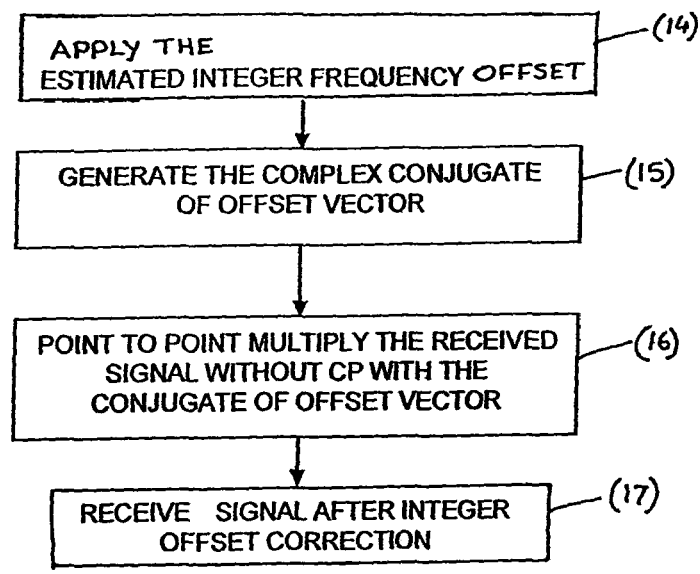
FIG. 4 is a flowchart of the method of correcting the integer frequency offset experienced by the received signals.

FIG. 4 is a flowchart showing a method of correcting the integer frequency offset where an offset vector which is the diagonal element of matrix P is generated (15) by applying (14) a complex conjugate of the estimated frequency offset multiply (16) the offset vector point to point with the received cyclic prefix removed signal block of size N. Counter rotating the samples of the received signal by the same amount of angular rotation experienced due to the integer frequency offset to receive (17) signal after integer offset correction.

Figure 5:
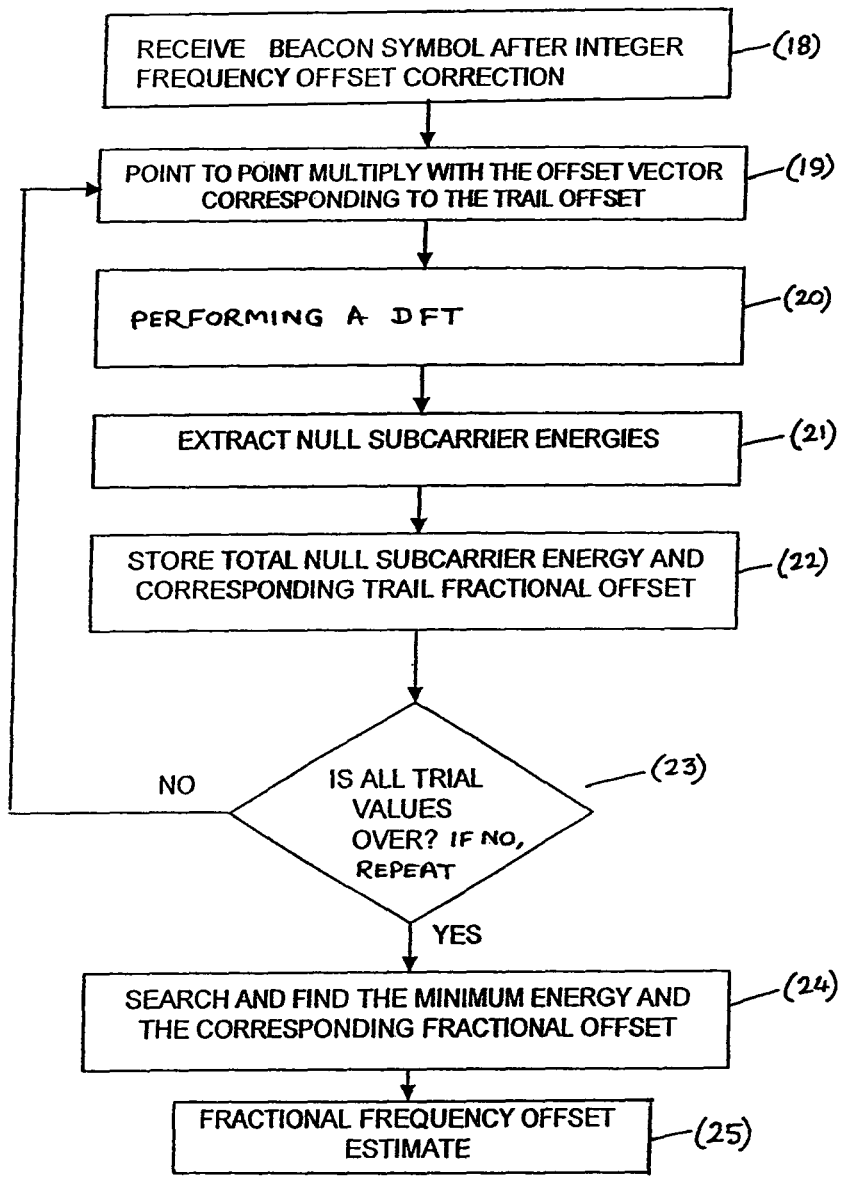
FIG. 5 is a flowchart of the method of estimating the fractional frequency offset from the received beacon symbol after correcting the integer frequency offset.

FIG. 5 is a flowchart of the method of estimating the fractional frequency offset wherein the integer frequency offset corrected signal is received (18) and point to point multiplied (19) with frequency offset vector corresponding to the trail value where the trail values are selected between −0.5 and +0.5, according to the resolution requirements of the fractional frequency offset estimation and after the said multiplication, the DFT is performed (20) and the total energy corresponding to the designated null subcarriers are extracted (21) and stored (22) in a register along with the trail value used for generating the frequency offset vector and this process is repeated (23) till the trial values are completed and then a search is conducted (24) to find out (25) the trail value which yield the minimum null subcarrier energy and the said trail value is designated as the estimated fractional frequency offset. The fractional frequency offset estimation can also depicted using Eq. (4) by initializing the matrix $\hat{P}$ with the trail values used for fractional frequency offset estimation.

Figure 6:
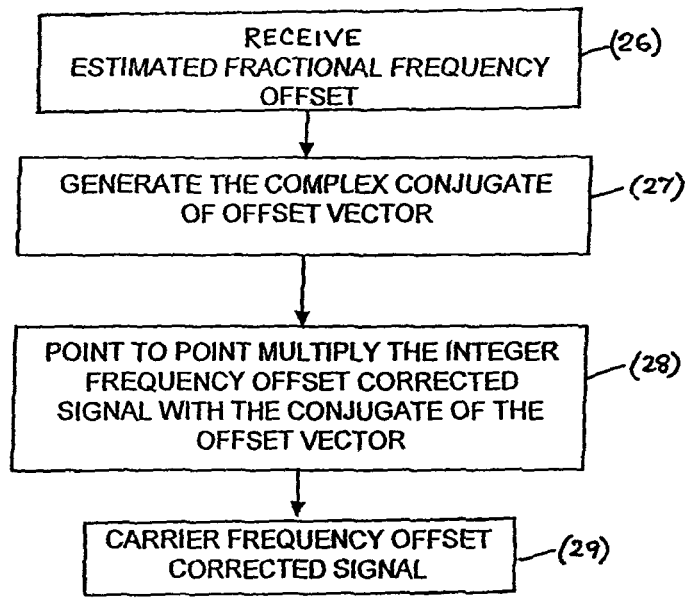
FIG. 6 is a flowchart of the method of correcting the fractional frequency offset experienced by the received integer frequency offset corrected signals.

FIG. 6 is a flowchart of the method of correcting the fractional frequency offset where the integer frequency corrected signal samples are received (26) to generate (27) the complex conjugate of offset vector, and are point to point multiplied (28) with the frequency offset vector which is the diagonal element of the matrix P by initializing it with the estimated fractional frequency offset and thereby obtain (29) the CFO compensated received signal.

A preferred embodiment of the invention described through FIGS. 1 to 6 with one transmit antenna instead of $N_t$ transmit antennas and with one or more receive antennas can be applied to the carrier frequency offset estimation of related downsized systems described as a single input single output orthogonal frequency division multiplexing (SISO-OFDM) or single input multi output orthogonal frequency division multiplexing (SIMO-OFDM) and the same null subcarrier allocation technique based on Fibonacci series can be applied to the above said systems as well.

Fibonacci Series Based Null Subcarrier Allocation

The null subcarrier allocation in the beacon symbol is extremely important for ensuring the estimation of CFO without any ambiguity. Methods reported in prior art include PN sequence based allocation and geometric series based allocation. While the PN sequence based allocation suffers with the disadvantage of high bandwidth overhead, the geometric series based allocation is suitable for small values of N only. The present embodiment of the invention suggests the use of a modified Fibonacci series based allocation of null subcarriers which ensures the identifiability of frequency offset over the entire range of OFDM bandwidth with a very small bandwidth overhead, where the Fibonacci series is generated by the following recurrence relation $$F(n) = 0 \text{ if } n = 0 \qquad (5)$$
$$= 1 \text{ if } n = 1$$
$$= F(n-1) + F(n-2) \text{ if } n > 2$$

where $F(n)$ represents the $n^{th}$ element of the Fibonacci series. The first few numbers of the series are 0, 1, 1, 2, 3, 5, 8, 13, 21, 34, 55, 89, 144, and so on. The present embodiment of the invention uses a truncated Fibonacci series by removing the first two elements from the series. The subcarrier indices as specified by the remaining numbers in the beacon symbol are imposed as null subcarriers. For example, when N=64, the null subcarrier indices can be selected as {1, 2, 3, 5, 8, 13, 21, 34, 55}. For large N, sometimes more null subcarriers may be required than that is provided by the proposed allocation, to meet a specific mean square estimation error requirement. In this case, more null subcarriers can be allocated by introducing a few more null subcarriers between two widely spaced null subcarriers. For example, when N=512, the last two null subcarriers indices are at 233 and 377 respectively. If desired, more null subcarriers can be introduced between these two, again based on Fibonacci series, by assuming 233 and 377 as the first and last null subcarrier indices, still retaining the identifiability of carrier frequency offset.

ADVANTAGES OF THE INVENTION

1) The proposed CFO estimation method can be used with any type of space-time coding scheme usually employed in MIMO-OFDM systems, with minor modifications.
2) The computational complexity and training overhead requirements of the proposed method are very low as compared to many state-of-art methods.
3) The method does not require MIMO channel estimate for the CFO estimation, which is a pre-requisite for many state-of-art methods, and which is complex to obtain.
4) The method can also be applied for the CFO estimation in conventional OFDM systems called SISO-OFDM and SIMO-OFDM.
5) The Fibonacci series based null subcarrier allocation is not known in the prior-art.
6) The two stage null subcarrier based integer and fractional frequency offset estimation approach used for reducing the number of computations is a potentially powerful technique but is not disclosed in the state of the art.
7) Bandwidth efficiency of the proposed technique is very high as compared to the state of the art methods which use training preambles.
8) None of the training preamble based prior art reported in (a) for MIMO OFDM provide a frequency offset estimation range equal to the OFDM bandwidth
9) The bandwidth overhead and computational complexities of the present embodiment are very low as compared to many prior art methods.

TESTING OF THE SYSTEM AND METHOD OF INVENTION

Performance of the present MIMO-OFDM CFO estimator is studied by considering an OFDM system with 256 subcarriers, with a subcarrier separation of 62.5 kHz, which meets the basic requirement of IEEE 802.16d standard. Each OFDM symbol is preceded by a CP of 16 samples. All simulations studies are conducted for simultaneous presence of AWGN and multipath fading channels. SUI-5 channel model proposed by IEEE 802.16 broadband wireless access working group, which provides a strong fading environment, is considered for the realization of the multipath fading channel. The performance metrics which are chosen are the widely accepted ones; the Normalized Mean Square Error (NMSE) of CFO estimator and the Bit Error Rate (BER) of the MIMO-OFDM receiver employing the proposed CFO estimator.

FIG. 7 shows the MSE performances of the proposed method for various transmits-receive antenna pairs. The representative frequency offset considered is 50.4 subcarrier spacings which is a real testing value. We consider two cases, viz $N_t=N_r=2$ and $N_t=N_r=3$. It can be observed that the proposed technique achieves an MSE of $10^{-4}$ at an SNR of 12 dB and it is less than $10^{-5}$ from 15 dB onwards for the first case. For the 3×3 scenario, the MSE is less than $10^{-6}$ from 13 dB onwards. This will meet the requirements of a typical practical implementation. The proposed method is found to yield a performance which is superior to that of [9] which uses a null subcarrier hoping technique for the CFO estimation. For example, for the 2×2 system, the proposed technique yields an SNR improvement of 6 dB at an MSE of $10^{-4}$. This mainly comes from the use of two stage frequency offset estimation instead of the null subcarrier line search used in [2], and the use of Fibonacci series based null subcarrier allocation.

The uncoded BER performances of the MIMO-OFDM system employing the proposed estimator are shown in FIG. 8. This is a more suitable metric than coded BER as the impact of fading channel on the frequency offset estimation technique will be clearly revealed. The modulation scheme used is 4-QAM with perfect channel estimation and zero forcing equalization. Error free channel estimation makes the study focused on the impact of synchronization errors introduced by various estimators. The curves shown are again for 2×2 and 3×3 systems. The proposed method achieves BERs of $10^{-3}$ at SNRs of 13 dB and 16 dBs, respectively for 2×2 and 3×3 systems. The 3×3 system achieves a BER less than $10^{-5}$ from 19 dB onwards which is very suitable for any kind of wireless communication systems. Also the proposed method for the 3×3 system performs 4 dB and 6 dB superior to [9] at BERs of $10^{-3}$ and $10^{-4}$ respectively.

REFERENCES CONSIDERED

[1] T. M. Schmidl and D. C. Cox, "Robust frequency and timing synchronization for OFDM," *IEEE Trans. Commun.*, vol. 45, no. 12, pp. 1613-1621, December 1997.
[2] M. Morelli and U. Mengali, "An improved frequency offset estimator for OFDM applications," *IEEE Commun. Lett.*, vol. 3, no. 3, pp. 75-77, March 1999.
[3] H. Liu and U. Tureli, "A high efficiency carrier estimator for OFDM communications," *IEEE Commun. Lett.*, vol. 2, pp. 104-106, April 1998
[4] X. Ma, C. Tepedelenlioglu, G. B. Giannakis, and S. Barbarossa, "Non-data-aided carrier offset estimators for OFDM with null subcarriers: Identifiability, Algorithms, and Performance," *IEEE J. Sel. Areas Commun.*, vol. 19, no. 12, pp. 2504-2511, December 2001.

[5] Defeng (David) Huang and K. B. Letaief, "Carrier frequency offset estimation for OFDM systems using null subcarriers," *IEEE Trans. Commun.*, vol. 54, no. 5, pp. 813-822, May 2006.

[6] A. N. Mody and G. L. Stuber, "Synchronization for MIMO OFDM systems," in *Proc. IEEE Globecom*, vol. 1, San Antonio, Tex., November 2001, pp. 509-513.

[7] Allert van Zelst and Tim C. W. Schenk, "Implementation of a MIMO OFDM-based wireless LAN system," *IEEE Trans. Signal Proc.*, vol. 52, no. 2, pp. 483-494, February 2004.

[8] G. L. Stuber, J. R. Barry, S. W. Mclaughlin, Ye Li, M. A. Ingram, and T. G. Pratt, "Broadband MIMO-OFDM wireless Communications," *Proc. IEEE*, vol. 92, no. 2, pp. 271-294, February 2004.

[9] X. Ma, M. Oh, G. B. Giannakis, and D. P. Park, "Hopping pilots for estimation of frequency offset and multiantenna channels in MIMOOFDM," *IEEE Trans. Commun*, vol. 53, no. 1, pp. 162-172, January 2005.

[10] Y. Yao and G. B. Giannakis, "Blind Carrier Frequency Offset Estimation in SISO, MIMO, and Multiuser OFDM Systems," *IEEE Trans. Commun*, vol. 53, no. 1, pp. 173-183, January 2005.

[11] Yong Sun, Zixiang Xiong, and Xiaodong Wang, "EM-Based Iterative Receiver Design With Carrier-Frequency Offset Estimation for MIMO OFDM Systems," *IEEE Trans. Commun*, vol. 53, no. 4, pp. 581-586, April 2005.

[12] Y. Jiang, X. You, and H. Minn, "MIMO OFDM Frequency Offset Estimator with Low Computational Complexity," in *Proc. IEEE ICC*, Glasgow, Scotland, June 2007, pp. 5449-5454.

[13] Jianglei Ma et al., "Synchronization in Multiple-Input/Multiple-Output (MIMO) Orthogonal Frequency Division Multiplexing (OFDM) System for Wireless Applications," U.S. Pat. No. 7,009,931 B2, Mar. 7, 2006

[14] A. N. Mody and G. L. Stuber, "Time and Frequency Synchronization in Multi-Input, Multi-Output (MIMO) Systems," U.S. Pat. No. 7,088,782 B2, Aug. 8, 2006

[15] J. H. Kim et al., "Apparatus for and method of compensation for frequency offset and channel variation MIMO-OFDM receiver," United States Patent Application, Pub. No. US 2006/0193392 A1, Aug. 31, 2006

[16] P. Priotti et al., "Method and apparatus for frequency synchronization in MIMO-OFDM wireless communication systems," United States Patent Application, Pub. No. US 2005/0041693 A1, Feb. 24, 2005

We claim:

1. A method of determining carrier frequency offset (CFO) in OFDM beacon signal in Multi-input Multi-output Orthogonal Frequency Division Multiplexing (MIMO-OFDM) based wireless communication systems, comprising:
    providing a MIMO-OFDM transmitter corresponding to the transmission of a beacon symbol allocated with a predetermined sequence of null subcarriers;
    providing an OFDM receiver corresponding to the beacon symbol transmitted from the transmitter;
    receiving the OFDM beacon signals on at least one receiving antenna and removing a cyclic prefix associated with each received OFDM beacon signal;
    combining the cyclic prefix removed signals using a diversity combining technique;
    converting the combined signals to the frequency domain by a N-point DFT operation including computing at the DFT output the energy content of all the N-subcarriers;
    computing the total energy of designated null subcarrier indices by introducing trial cyclic shifts from 0 to N−1;
    storing the total energy of the designated null subcarriers against the trail integer offset shift in an N-element array; and
    conducting a search to identify the minimum energy and the corresponding integer shift which represents the integer frequency offset experienced by the MIMO-OFDM signal.

2. The method of claim 1, further comprising correcting the integer frequency offset in a signal by the steps of:
    generating an offset vector by applying a complex conjugate of the determined integer frequency offset;
    multiplying point-to-point the generated offset vector with a signal block from which a cyclic prefix is removed; and
    obtaining an integer frequency offset corrected signal by counter rotating samples of a received signal by a corresponding amount of angular rotation experienced due to integer frequency offset.

3. The method of claim 2, further comprising determining a fractional frequency offset in the integer frequency offset corrected signal by the steps of:
    generating a frequency offset vector and multiplying point-to-point the integer frequency offset corrected signal by the frequency offset vector corresponding to a trail value, the trail value being selected between (−0.5) to (+0.5) with increments of $1/N_f$, where the total number of trial values $N_f$ depend on the resolution requirements of the determined fractional frequency offset;
    performing a DFT on the resultant frequency offset vector multiplied signal;
    extracting the total energy corresponding to the designated null subcarriers and storing the value in a register along with said trail value and repeating this step until all the trail values are completed; and
    conducting a search to identify the trail value which yields the minimum null subcarrier energy, said trail value representing the determined fractional frequency offset.

4. The method of claim 3, further comprising correcting the fractional frequency offset by the steps of:
    generating a complex conjugate of an offset vector based on a fractional frequency offset signal;
    point-point multiplying the complex conjugate of the offset vector with an integer frequency offset corrected signal; and
    obtaining a complete carrier frequency offset corrected signal.

5. The method as claimed in claim 1, wherein the size of the complex block data received at the transmitter is of N-samples with N-subcarriers spaced at a separation $\Delta F=B/N$, wherein B is the total system bandwidth, and wherein R-subcarriers are data carriers and N-R subcarriers are null subcarriers.

6. The method as claimed in claim 5, wherein the N-R subcarriers are imposed as null by employing a permutation matrix, and wherein each block of data is preceded by a cyclic prefix.

7. The method as claimed in claim 1, wherein a transmitted signal from a $j^{th}$ transmit antenna (j=1, 2, ..., Nt) is represented by $$u'_j(d) = \frac{1}{\sqrt{N}} \sum_{k=0}^{N-1} s_j(k) \exp\left(\frac{j2\pi dk}{N}\right) \quad (6)$$

with $d = -L, -(L-1), \ldots, 0, 1, 2, \ldots, N-1$ where $s_j(k)$ is the data symbol at the k-th subcarrier and L is the length of the cyclic prefix.

8. The method as claimed in claim 7, wherein a received signal on an $i^{th}$ receive antenna (i=1, 2, ..., Nr) of a receiver is given by:

$$r_i(d) = \frac{1}{\sqrt{N}} \sum_{j=1}^{N_t} \sum_{k=0}^{N-1} H_{i,j}(k) s_j(k) \exp\left(\frac{j2\pi d}{N}[k + \phi_m]\right) + z_i(d) \quad (7)$$

with $d = -L, -(L-1), \ldots, 0, 1, 2, \ldots, N-1$ where, $H_{i,j}(k)$ is the channel frequency response at the k-th subcarrier between $i^{th}$ transmit antenna and $j^{th}$ receive antenna, $\phi$ is the normalized carrier frequency offset, and $z_i(n)$ is complex AWGN for the $i^{th}$ receiver.

9. The method as claimed in claim 1, wherein the null subcarriers are allocated by using a modified Fibonacci series which is generated by the following recurrence relation:

$$F(n) = 0 \text{ if } n = 0 \quad (5)$$
$$= 1 \text{ if } n = 1$$
$$= F(n-1) + F(n-2) \text{ if } n > 2$$

where $F(n)$ represents the $n^{th}$ element of the Fibonacci series and wherein the modified Fibonacci series is formulated as a truncated Fibonacci series by removing the first two elements from the series.

* * * * *

UNITED STATES PATENT AND TRADEMARK OFFICE
CERTIFICATE OF CORRECTION

PATENT NO. : 8,520,778 B2  Page 1 of 1
APPLICATION NO. : 12/989517
DATED : August 27, 2013
INVENTOR(S) : Sameer et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 408 days.

Signed and Sealed this

Fifteenth Day of September, 2015

Michelle K. Lee
*Director of the United States Patent and Trademark Office*